(12) United States Patent
Gao et al.

(10) Patent No.: US 7,214,744 B2
(45) Date of Patent: May 8, 2007

(54) BORATE ACTIVATOR

(75) Inventors: Xiaoliang Gao, Calgary (CA); Isam Jaber, Calgary (CA)

(73) Assignee: Nova Chemicals (International) S.A. (CH)

( * ) Notice: Subject to any disclaimer, the term of this patent is extended or adjusted under 35 U.S.C. 154(b) by 37 days.

(21) Appl. No.: 11/158,719

(22) Filed: Jun. 22, 2005

(65) Prior Publication Data

US 2006/0009596 A1 Jan. 12, 2006

(30) Foreign Application Priority Data

Jul. 8, 2004 (CA) .................................. 2473378

(51) Int. Cl.
*C08F 4/60* (2006.01)
*C08F 4/64* (2006.01)

(52) U.S. Cl. ...................... 526/133; 526/140; 526/142; 526/165; 502/103; 502/114; 502/128; 502/132

(58) Field of Classification Search ................ 526/133, 526/140, 142, 165; 502/103, 114, 128, 132
See application file for complete search history.

(56) References Cited

U.S. PATENT DOCUMENTS

| | | | |
|---|---|---|---|
| 3,248,179 A | 4/1966 | Norwood ...................... | 23/285 |
| 4,543,399 A | 9/1985 | Jenkins, III et al. .......... | 526/70 |
| 4,613,484 A | 9/1986 | Ayres et al. ................. | 422/132 |
| 5,057,475 A | 10/1991 | Canich et al. .............. | 502/104 |
| 5,278,264 A | 1/1994 | Spaleck et al. ............. | 526/127 |
| 5,296,434 A | 3/1994 | Karl et al. .................. | 502/117 |
| 5,527,752 A | 6/1996 | Reichle et al. .............. | 502/117 |
| 5,589,555 A | 12/1996 | Zboril et al. ................. | 526/64 |
| 5,637,660 A | 6/1997 | Nagy et al. ................. | 526/160 |
| 5,851,945 A | 12/1998 | Turner et al. ............... | 502/103 |
| 5,852,145 A | 12/1998 | McLain et al. ............. | 526/133 |
| 5,895,771 A | 4/1999 | Epstein et al. ............. | 502/103 |
| 6,372,864 B1 | 4/2002 | Brown ........................ | 526/65 |
| 6,720,396 B2 | 4/2004 | Bell et al. ................... | 526/160 |

OTHER PUBLICATIONS

Allan et al., Fully fluorinated alkoxides. Part IV. Derivatives of perfluoropinacol, Can. J. Chem. 1968, 46, pp. 3671-3677.
David R. Lide, Ed., Periodic Table of the Elements, CRC Handbook of Chemistry and Physics, CRC Press 81st Edition, 2000.

*Primary Examiner*—Caixia Lu
(74) *Attorney, Agent, or Firm*—Kenneth H. Johnson

(57) ABSTRACT

A catalyst system comprising (i) a bulky ligand catalyst compound; and (ii) a novel borate activator is active for olefin polymerization. The novel borate contains at least one chelating (divalent) ligand and contains at least one fluorine atom. Preferred borate activators are provided as anilinium or carbonium salts. Highly preferred borate salts contain two perfluorinated alkoxy chelating ligands. The catalyst system may be used to produce polyethylene for "end use" applications such as polyethylene film and molded polyethylene goods.

8 Claims, 1 Drawing Sheet

BORATE ACTIVATOR

FIELD OF THE INVENTION

This invention relates to a novel boron activator for olefin polymerization.

BACKGROUND OF THE INVENTION

Aluminum alkyls are well known as cocatalysts for conventional Ziegler Natta catalysts. More recently, many new catalysts for olefin polymerization have been invented. These new catalysts are, in general, well defined organometallic compounds with bulky ligands (whereas, in contrast, the prior art Ziegler Natta catalysts are, in general, simple transition metal halides). Numerous cocatalysts or activators have been proposed for these new catalysts, including methyl aluminoxane (or "MAO") and ionic boron activators. These cocatalysts/activators provide high activity but are expensive to synthesize.

An elegant family of alkoxy aluminates are disclosed In U.S. Pat. No. 5,895,771 (Epstein et al.) but the data reported in this patent illustrate that these aluminates are not particularly active.

We have now discovered a simple chelating borate which provides excellent activity for olefin polymerization.

SUMMARY OF THE INVENTION

The present invention provides a process for the polymerization of at least one $C_2$ to $C_8$ alpha olefin monomer in the presence of a catalyst system comprising:

(i) a catalyst compound; and
(ii) an activator defined by the formula:

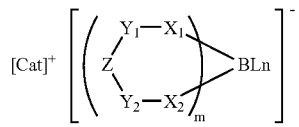

wherein:

$X_1$ and $X_2$ are selected from the group consisting of O, $NR_1$, S;

$Y_1$ and $Y_2$ are selected from the group consisting of $CR_2R_3$, $SiR_4R_5$; and Z is selected from the group consisting of a bond, $CR_8R_7$, $SiR_8R_9$, $NR_{10}$, and $PR_{11}$, wherein each of $R_1$ to $R_{11}$ is selected from the group consisting of i) a $C_1$ to $C_{20}$ hydrocarbyl group and ii) a perfluorinated $C_1$ to $C_{20}$ hydrocarbyl group with the proviso that at least one of $Y_1$ and $Y_2$ contains at least one fluorine atom; and each L is independently fluorinated alkyl, fluorinated aryl, fluorinated alkoxy, fluorinated aryloxy, alkoxy or aryloxy ligand;

n=0, 2, m=2, 1;

2m+n=4; and $[Cat]^+$ is a non-interfering cation.

DETAILED DESCRIPTION

Figure 1:
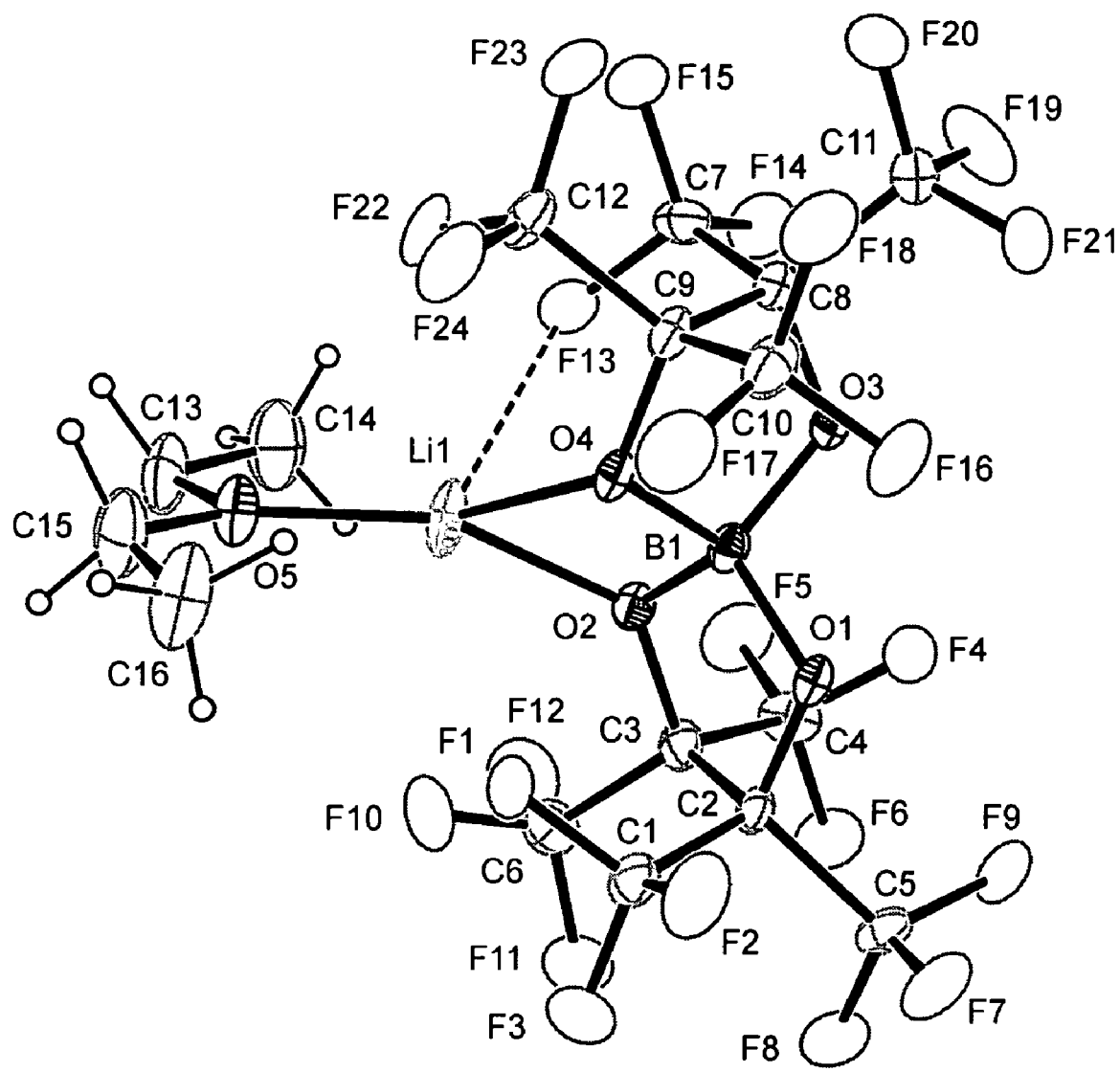
FIG. 1 is an ORTEP diagram of $Li(OEt_2) B[OC(CF_3)_2C(CF_3)_2O]_2$.

As used herein, the phrase "catalyst system" includes at least one "catalyst compound" and the novel "activator" which characterizes this invention, both of which are described further herein. The catalyst system may also include other components, such as supports, poison scavengers, etc.

As used herein, the phrase "catalyst compound" includes any compound that, once appropriately activated, is capable of catalyzing the polymerization or oligomerization of olefins. The catalyst compound comprises at least one Group 3 to Group 15 atom (preferably a Group 4 to 12 transition metal) or lanthanide or actinide atom, and optionally at least one leaving group bound thereto.

As used herein, the phrase "leaving group" refers to one or more chemical moieties bound to the metal center of the catalyst compound that can be abstracted from the catalyst compound, thus producing a species active towards olefin polymerization or oligomerization.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, a "hydrocarbyl" includes aliphatic, cyclic, olefinic, acetylenic and aromatic radicals (i.e., hydrocarbon radicals) comprising hydrogen and carbon that are deficient by one hydrogen. A "hydrocarbylene" is deficient by two hydrogens.

As used herein, an "alkyl" includes linear, branched and cyclic paraffin radicals that are deficient by one hydrogen. Thus, for example, a —$CH_3$ group ("methyl") and a $CH_3CH_2$— group ("ethyl") are examples of alkyls.

As used herein, an "alkenyl" includes linear, branched and cyclic olefin radicals that are deficient by one hydrogen; alkynyl radicals include linear, branched and cyclic acetylene radicals deficient by one hydrogen radical.

As used herein, "aryl" groups includes phenyl, naphthyl, pyridyl and other radicals whose molecules have the ring structure characteristic of benzene, naphthylene, phenanthrene, anthracene, etc. For example, a $C_6H_5^-$ aromatic structure is an "phenyl", a $C_6H_4^{2-}$ aromatic structure is an "phenylene". An "arylalkyl" group is an alkyl group having an aryl group pendant therefrom, examples of which include benzyl, phenethyl, tolylmethyl and the like; an "alkylaryl" is an aryl group having one or more alkyl groups pendant therefrom, examples of which include tolyl, xylyl, mesityl, cumyl and the like.

As used herein, an "alkylene" includes linear, branched and cyclic hydrocarbon radicals deficient by two hydrogens. Thus, —$CH_2$— ("methylene") and —$CH_2CH_2$— ("ethylene") are examples of alkylene groups. Other groups deficient by two hydrogen radicals include "arylene" and "alkenylene".

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like.

As used herein, "heterocyclic" refers to ring systems having a carbon backbone that comprise from 1 to 3 atoms selected from the group consisting of boron, aluminum, silicon, germanium, nitrogen, phosphorous, oxygen and sulfur, unless the heteroatom (non carbon atom) is described.

As used herein, an "kylcarboxylate", "arylcarboxylate", and "alkylarylcarboxylate" is an alkyl, aryl, and alkylaryl, respectively, that possesses a carboxyl group in any position. Examples include $C_6H_5CH_2C(O)O^-$, $CH_3C(O)O^-$, etc.

As used herein, "non-interfering" means that the ligand (or cation) being referred to does not interfere with olefin polymerization (i.e. that it does not reduce the activity of olefin polymerization by more than 50% in comparison to a polymerization conducted in the absence of the ligand or cation).

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkylcarbamoyl radicals, acyloxy radicals, acylamino radicals, arylamino radicals, and combinations thereof.

As used herein, structural formulas are employed as is commonly understood in the chemical arts; lines ("—") used to represent associations between a metal atom ("M", Group 3 to Group 15 atoms) and a ligand or ligand atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

Unless stated otherwise, no embodiment of the present invention is herein limited to the oxidation state of the metal atom "M" as defined below in the individual descriptions and examples that follow. The ligation of the metal atom "M" is such that the compounds described herein are neutral, unless otherwise indicated.

Catalyst Compound

In general, any catalyst compound which is activated by methyl aluminoxane (MAO) is particularly suitable for use In the present invention. An extensive discussion of such catalysts is provided in U.S. Pat. No. 6,720,396 (Bell et al.; assigned to Univation Technologies) and the references cited therein (disclosure to all of which is incorporated herein by reference). A general (non-limited) overview of such catalyst compounds follows. Such catalysts typically contain a "bulky" ligand.

The bulky ligands are generally represented by one or more open, acyclic, or fused ring(s) or ring system(s) or a combination thereof. The ring(s) or ring system(s) of these bulky ligands are typically composed of atoms selected from Groups 13 to 16 atoms of the Periodic Table of Elements. Preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, catalyst compounds are represented by the formula:

$$L^A L^B MQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is zirconium, hafuium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of .eta.-bonding to M, preferably .eta.$^3$-bonding to M and most preferably .eta.$^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, phosphinimides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted heteroatom radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. As used herein the term "leaving group" is any ligand that can be abstracted from a bulky ligand catalyst compound to form a bulky ligand catalyst species capable of polymerizing one or more olefin(s). In one embodiment, a is a monoanionic labile ligand having a sigma-bond to M. Depending on the oxidation state of the metal, the value for n is 0, 1 or 2 such that formula (I) above represents a neutral bulky ligand catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, triflurom- ethyl, tetramethylene, pentamethylene, methylidene, methyoxy, ethyoxy, propoxy, phenoxy, bis(N-methylanilide), dimethylamide, dimethylphosphide radicals and the like.

In another embodiment, the catalyst compound is represented by the following formula:

$$L^A AL^B MQ_n \quad (II)$$

These compounds represented by formula (II) are known as bridged, ligand catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, substituted chalcogen, or halogen or two or more R' may be joined to form a ring or ring system. In one embodiment, the bridged, ligand catalyst compounds of formula (II) have two or more bridging groups A.

In one embodiment, the catalyst compounds are those where the R substituents on the bulky ligands $L^A$ and $L^B$ formulas (I) and (II) are substituted with the same or different number of substituents on each of the bulky ligands. In another embodiment, the bulky ligands $L^A$ and $L^B$ of formulas (I) and (II) are different from each other.

In one embodiment, catalyst compounds useful in the invention include bridged heteroatom, mono-bulky ligand compounds. These types of catalysts and catalyst systems are described in U.S. Pat. No. 5,057,475.

In another embodiment, the catalyst compound is represented by the formula:

$$L^C AJMQ_n \quad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (III) above, $L^C$, A and J may form a fused ring system. In an embodiment, $L^C$ of formula (III) is as defined above for $L^A$ in formula (I) and A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, catalyst compound is a complex of a metal, preferably a transition metal, a bulky ligand, preferably a substituted or unsubstituted pi-bonded ligand, and one or more heteroallyl moieties, such as those described in U.S. Pat. No. 5,527,752.

In another embodiment, the catalyst compounds are represented by the formula:

$$L^D MQ_2(YZ)X_n \quad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—. Y is either C or S. Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand catalyst compounds are described in U.S. Pat. No. 5,637,660.

In one embodiment, the catalyst compounds are represented by the formula:

(V)

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is also within the scope of this invention, in one embodiment, that the catalyst compounds include complexes of Ni$^{2+}$ and Pd$^{2+}$ described in U.S. Pat. No. 5,852,145. These complexes can be either dialkyl ether adducts, or alkylated reaction products of the described dihalide complexes that can be activated to a cationic state by the activators of this invention described below.

Also included as catalyst compounds are those diimine based ligands of Group 8 to 10 metal compounds.

Other suitable catalyst compounds are those Group 5 and 6 metal imido complexes described in U.S. Pat. No. 5,851,945, which is incorporated herein by reference. In addition, bulky ligand catalyst compounds include bridged bis(arylamido) Group 4 compounds, bridged bis(amido) catalyst compounds and catalysts having bis(hydroxy aromatic nitrogen ligands).

It is also contemplated that in one embodiment, the catalyst compounds of the invention described above include their structural or optical or enantiomeric isomers (meso and racemic isomers) and mixtures thereof.

Other catalyst compounds useful in this invention are disclosed in the aforementioned U.S. Pat. No. 6,720,396 (and references therein), reference to all of which is incorporated herein.

Novel Activator

The borate anion is preferably provided in the form of a simple salt represented by the formula:

[Cat]$^+$[BA]$^-$ wherein [BA]$^-$ is the borate anion which characterizes this invention and [Cat]$^+$ is a non-interfering cation—i.e. a cation which does not interfere with the polymerization process. [Cat]$^+$ is preferably selected from the group consisting of anilinium, oxonium, sulfonium, silylium, silver, phosphonium, lithium, sodium, potassium, carbonium and ferrocenium. Examples of [Cat]$^+$ include: triethylammonium tetra(phenyl)boron, tripropylammonium tetra(phenyl)boron, tri(n-butyl)ammonium tetra(phenyl)boron, trimethylammonium tetra(p-tolyl)boron, N,N-dialkyl anilinium cations such as N,N-dimethylanilinium tetra(phenyl)boron, N,N-diethylanilinium tetra(phenyl)boron, N,N-2,4,6-pentamethylanilinium tetra(phenyl)boron and the like; dialkyl ammonium cations such as di-(isopropyl)ammonium tetra(pentafluorophenyl)boron, dicyclohexylammonium tetra(phenyl)boron and the like; and triaryl carbonium salts (cations) such as triphenylcarbonium (or "trityl") tetra(phenyl)boron.

The borate anion (i.e. [BA]$^-$ above) is defined by the formula:

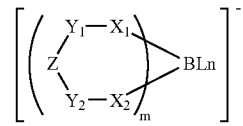

wherein:

X$_1$ and X$_2$ are selected from the group consisting of O, NR$_1$, S;

Y$_1$ and Y$_2$ are selected from the group consisting of CR$_2$R$_3$, SiR$_4$R$_5$ (with the proviso that at least one of Y$_1$ and Y$_2$ contains at least one fluorine atom); and Z is selected from the group consisting of a bond, CR$_6$R$_7$, SiR$_8$R$_9$, NR$_{10}$, PR$_{11}$;

each R$_1$ to R$_{11}$, is a C$_1$ to C$_{20}$ hydrocarbyl group, with the proviso that at least one of R$_2$, R$_3$, R$_4$ and R$_5$ contains at least one fluorine atom;

m is 1 or 2; when m is 1, then n is 1 or 2, depending upon the valence of L and each L, when present, is a non-interfering ligand.

When m is 1, L may be a single, non-interfering divalent ligand.

It is preferred that m=2. When m=1, it is preferred than n=2 and that each L is a monovalent ligand selected from the group consisting of fluorinated alkyl, fluorinated aryl, fluorinated alkoxy, fluorinated aryloxy, alkoxy or aryloxy ligands.

As noted above, it is preferred that m=2—i.e. that the boron contains two divalent chelating ligands. While not wishing to be bound by theory, it is believed that the chelating ligands are more stable under polymerization conditions (i.e. less prone to decomposition) than the analogous monovalent alkoxy ligands of the prior art.

The chelating divalent ligand of this invention must be fluorinated (in that each of $Y_1$ and $Y_2$ must contain at least one fluorine atom). It is highly preferred that each of $Y_1$ and $Y_2$ is perfluorinated (and especially that each of $Y_1$ and $Y_2$ is a perfluorinated, non-cyclic group having from 3 to 5 carbon atoms).

It is most highly preferred that:
m is 2;
each X is oxygen;
each Y is a perfluorinated hydrocarbyl having 3 carbon atoms;
and Z is a bond (and the synthesis of lithio and trityl salts of this most preferred species is disclosed in the examples).

It is most highly preferred that X is oxygen and that each of $Y_1$ and $Y_2$ is defined by the formula:

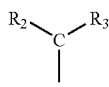

wherein each $R_2$ and $R_3$ is a perfluorinated hydrocarbyl having from 3 to 5 carbon atoms (with the further proviso that $R_2$ and $R_3$ are not bridged together) and wherein the—indicates a bond to Z.

In general, the activator and catalyst compounds are used in mole ratios of boron (activator) to transition metal of from 0.3:1 to 10:1, especially from 0.8:1 to 5:1.

Polymerization Process

Polymerization processes suitable for this include solution, gas phase, slurry phase and a high pressure process or a combination thereof.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the polymerization process of the invention include ethylenically unsaturated monomers, diolefins having 4 to 18 carbon atoms, conjugated or non-conjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a solution polymerization process.

In another embodiment of the process of the invention, ethylene or propylene is polymerized with at least two different comonomers, optionally one of which may be a diene, to form a terpolymer.

In one embodiment, the invention is directed to a polymerization process for polymerizing propylene alone or with one or more other monomers including ethylene, and/or other olefins having from 4 to 12 carbon atoms. Polypropylene polymers may be produced using the particularly bridged bulky ligand catalyst compounds as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. No. 4,543,399, incorporated herein by reference.)

The reactor pressure in a gas phase process may vary from about 100 psig (690 kPa) to about 500 psig (3,448 kPa), preferably in the range of from about 200 psig (1,379 kPa) to about 400 psig (2,759 kPa), more preferably in the range of from about 250 psig (1,724 kPa) to about 350 psig (2,414 kPa).

The reactor temperature in a gas phase process may vary from about 30° C. to about 120° C., preferably from about 60° C. to about 115° C., more preferably in the range of from about 70° C. to about 110° C., and most preferably in the range of from about 70° C. to about 95° C.

Other gas phase processes contemplated by the process of the invention include series or multistage polymerization processes.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1,000 lbs/hr (455 Kg/hr), more preferably greater than 10,000 lbs/hr (4,540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2,000 lbs of polymer per hour (907 Kg/hr), more preferably greater than 5,000 lbs/hr (2,268 Kg/hr), and most preferably greater than 10,000 lbs/hr (4540 Kg/hr). In another embodiment the slurry reactor used in the process of the invention is producing greater than 15,000 lbs of polymer per hour (6,804 Kg/hr), preferably greater than 25,000 lbs/hr (11,340 Kg/hr) to about 100,000 lbs/hr (45,500 Kg/hr).

Examples of solution processes are described in U.S. Pat. Nos. 6,372,864 and 5,589,555, which are fully incorporated herein by reference.

These solution processes for olefin (co)polymerization are well known in the art. The processes are conducted in the presence of a $C_5$ to $C_{12}$ hydrocarbon solvent such as pentane, methyl pentane, hexane, heptane, octane, cyclohexane, methylcyclohexane, naptha, or mixtures thereof. The solvent may contain chlorinated hydrocarbons. An example of a suitable solvent is ISOPAR E (aliphatic solvent, Exxon Chemical Co.).

The polymerization temperature is typically fro about 30° C. to 350° C., preferably from 80° C. to 250° C. In a preferred process, two reactors in series are used. The first reactor operates at a temperature of from 80 to 180° C. and the second at a temperature of up to 250° C. Preferred operating pressures are from about 2,000 to 4,000 psig (about 14,000 to 28,000 kiloPascals).

Part A: Chelating Borate Synthesis

The sodium salt of the bis(perfluoropinacolato)borate was reported in 1968 (M. Allan, A. F. Janzen and C. J. Willis, Can. J. Chem. 1968, 46, 3671). A new synthesis (described generally by the following three formulae) is reported as follows.

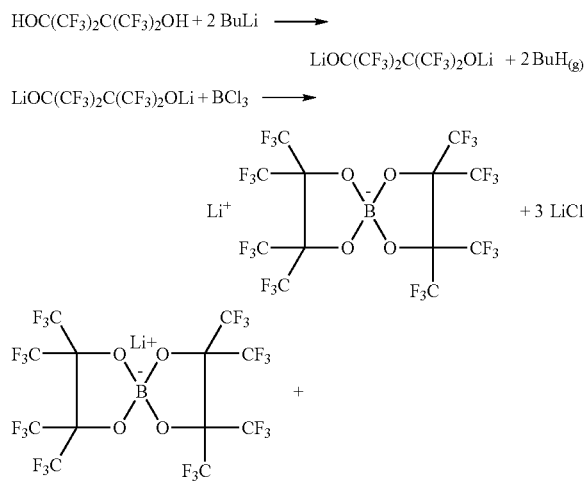

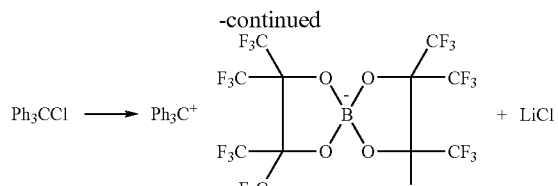

LiOC(CF$_3$)$_2$C(CF$_3$)$_2$OLi: n-BuLi (7.75 mL, 12.4 mmol) was added dropwise to a pr oled mixture of hexafluoro-2,3-bis(trifluoromethyl)-2,3-butanediol (perfluoropinacol) (2.07 g, 6.19 mmol) in pentane. The reaction became turbid, which was stirred overnight and filtered. The solid was washed with pentane and was dried under vacuum. Isolated 1.9 g, 89% yield, analysis by Proton Nuclear Magnetic Resonance ("NMR") ($^1$H NMR (THF-d8)) lacked the OH peak at 8.21 ppm (singlet). Analysis by fluorine NMR showed $^{19}$F NMR (THF-d8, with C$_6$F$_6$ capillary insert)-70.45 ppm (singlet).

Li(OEt$_2$) B[OC(CF$_3$)$_2$C(CF$_3$)$_2$O]$_2$: LiOC(CF$_3$)$_2$C(CF$_3$)$_2$OLi (1.02 g, 2.96 mmol) was dissolved in ether and cooled to −78° C. To this, boron trichloride (8.45 mL, 0.174 M solution in ether) was added dropwise. After warming up to room temperature overnight with constant stirring, a white precipitate was present. The solvent was evaporated under vacuum and the resultant solid was extracted with hot toluene. The toluene solution was filtered when hot and the filtrate was chilled at −40° C. The white crystalline solid was separated from toluene by decantation, washed with pentane and was dried under vacuum. $^{19}$F NMR in THF-d8 showed the compound was pure at this stage. Sublimation at 75° C., 80 mtorr gave X-ray quality crystals. $^1$H NMR (THF-d8) 1.11 ppm (triplet, 6H), 3.38 ppm (quartet, 4H). $^{19}$F NMR (THF-d8, with C$_6$F$_6$ capillary insert)-68.41 ppm (singlet).

As shown in FIG. 1, an ether molecule is associated with the lithium.

[Ph$_3$C]$^+$[B{OC(CF$_3$)$_2$C(CF$_3$)$_2$O}$_2$]$^-$: Trityl chloride (0.114 g, 0.409 mmol) was added to Li(OEt$_2$) B[OC(CF$_3$)$_2$C(CF$_3$)$_2$O]$_2$ (0.306 g, 0.405 mmol) in dicholoromethane. Reaction immediately turned bright yellow in color. After being stirred at room temperature for 5 hours, the reaction was filtered to remove LiCl. The yellow filtrate was pumped to dryness to give crystalline solid (in quantitative yield). $^1$H NMR (CD$_2$Cl$_2$) 7.9 ppm (broad multiplet). $^{19}$F NMR (CD$_2$Cl$_2$, C$_6$F$_6$ capillary insert)-68.50 ppm (singlet).

An Oak Ridge Thermal Ellipsoid Plot (or "ORTEP") diagram which illustrates the solid-state structure of the lithio salt is provided as FIG. 1.

Important bond lengths and bond angles are reported in Table A.1.

TABLE A.1

| Important Bond Lengths (Angstrom, Å) | | | |
|---|---|---|---|
| F(13)—Li(1) | 2.40(2) | O(1)—B(1) | 1.441(10) |
| O(2)—Li(1) | 1.982(16) | O(2)—B(1) | 1.496(10) |
| O(4)—Li(1) | 2.010(16) | O(3)—B(1) | 1.437(10) |
| O(5)—Li(1) | 1.865(15) | O(4)—B(1) | 1.504(10) |
| Important Bond Angles (°) | | | |
| O(3)—B(1)—O(1) | 111.3(6) | O(3)—B(1)—O(4) | 103.9(6) |
| O(3)—B(1)—O(2) | 117.3(7) | O(1)—B(1)—O(4) | 118.4(7) |
| O(1)—B(1)—O(2) | 103.4(6) | O(2)—B(1)—O(4) | 102.9(5) |

Part B: Continuous Solution Polymerization

All the polymerization experiments described below were conducted on a continuous solution polymerization reactor. The process is continuous in all feed streams (solvent, monomers and catalyst) and in the removal of product. All feed streams were purified prior to the reactor by contact with various absorption media to remove catalyst killing impurities such as water, oxygen and polar materials as is known to those skilled in the art. All components were stored and manipulated under an atmosphere of purified nitrogen.

All the examples below were conducted in a reactor of 71.5 cc internal volume. In each experiment the volumetric feed to the reactor was kept constant and as a consequence so was the reactor residence time.

The catalyst solutions were pumped to the reactor independently and there was no pre-contact between the activator and the catalyst. Because of the low solubility of the catalysts, activators in xylene and methylaluminoxane (MAO) in cyclohexane, solutions were prepared in purified xylene. The catalyst was activated in situ (in the polymerization reactor) at the reaction temperature in the presence of the monomers. The polymerizations were carried out in cyclohexane at a pressure of 1,500 psi. Ethylene was supplied to the reactor by a calibrated thermal mass flow meter and was dissolved in the reaction solvent prior to the polymerization reactor. Under these conditions the ethylene conversion is a dependent variable controlled by the catalyst concentration, reaction temperature and catalyst activity, etc.

The internal reactor temperature is monitored by a thermocouple in the polymerization medium and can be controlled at the required set point to +/−0.5° C. Downstream of the reactor the pressure was reduced from the reaction pressure (1,500 psi) to atmospheric. The solid polymer was then recovered as a slurry in the condensed solvent and was dried by evaporation followed by oven drying before analysis.

The ethylene conversion was determined by a dedicated on-line gas chromatograph by reference to propane which was used as an internal standard. The average polymerization rate constant was calculated based on the reactor hold-up time, the catalyst concentration in the reactor and the ethylene conversion and is expressed in l/(mmol*min). Average polymerization rate (kp)=(Q/(100−Q)).times.(1/[TM]).times.(1/HUT), where:

Q is the percent ethylene conversion;

[TM] is the catalyst concentration in the reactor expressed in mM; and

HUT is the reactor hold-up time in minutes.

A series of ethylene homopolymerizations were then conducted using tri(tertiary butyl) phosphinimine titanium dimethyl (CpTiNP(tBu)$_3$Me$_2$, wherein tBu is tertiary butyl and Me is methyl) as the catalyst compound and the trityl salt of the chelating borate from Part A (i.e. [Ph$_3$C]$^+$[B{OC(CF$_3$)$_2$C(CF$_3$)$_2$O}$_2$]$^-$) as the activator.

A commercially available MAO (MMAO-7, from Albemarie) was used to scavenge poisons. A hindered phenol (2,6-di-tertiary butyl-4-ethyl phenol) was added to the MAO at an Al/OH ratio of about 3.3/1. The MAO was added to the polymerization reactor so as to provide an aluminum concentration of about 14.5 micromoles per liter for experiments 14 and about 6.3 micromoles per liter for experiment 5. (It will be appreciated by those skilled in the art that MAO is (itself) an activator for bulky olefin polymerization catalysts. However, the concentrations of MAO used in these experiments were not high enough to provide commercially useful rates of polymerization, given the impurity levels in the monomers and solvents used in these experiments.)

Catalyst and activator concentrations for experiments 1 to 5 are reported in Table B.1.

The total solution feed rate to the reactor was about 26 milliliters per minute for all experiment, with an ethylene flow of about 1.0 grams per minute. As shown in Table 1, ethylene conversions of between 80.9 and 97.9% were observed. A Kp (polymerization constant, as defined above) of 30,800 was observed for experiment 4 which illustrates the excellent performance of the activator used in the process of this invention.

The data in Table 1 show that the activator of this invention did not function in a "stoichiometric" manner under the polymerization conditions of these experiments (i.e. the activity increased as the boron/titanium ratio was increased from 1/1 to 3/1 in experiments 1 to 4).

In experiment 5, the concentration of MAO in the reactor was reduced but the molar B/Ti ratio was increased to 4/1. The polymerization activity of experiment 5 was observed to decrease (in comparison to experiment 4). This may indicate that the level of MAO was insufficient to scavenge the impurities/poisons in the monomers/solvent (or alternatively, it may indicate that the activity may be maximized by optimizing a boron to MAO ratio).

TABLE B.1

| Run # | Catalyst$^a$ | Activator$^b$ | % Conversion | Kp (L/mmol Ti.min) |
|---|---|---|---|---|
| 1 | 0.59 | 1.0 | 80.9 | 2,763 |
| 2 | 0.59 | 1.5 | 92.6 | 8,123 |
| 3 | 0.59 | 2.0 | 96.2 | 16,527 |
| 4 | 0.59 | 3.0 | 97.9 | 30,800 |
| 5 | 0.26 | 4.0 | 90.3 | 13,806 |

$^a$micromoles of Ti per liter
$^b$moles of boron/moles of Ti

The embodiments of the invention in which an exclusive property or privilege is claimed are as follows:

1. A process for the polymerization of at least one C$_2$ to C$_8$ alpha olefin monomer in the presence of a catalyst system comprising:

(i) a catalyst compound; and (ii) an activator defined by the formula:

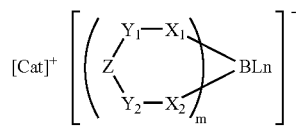

wherein:

X$_1$ and X$_2$ are selected from the group consisting of O, NR$_1$, S;

Y$_1$ and Y$_2$ are selected from the group consisting of CR$_2$R$_3$, SiR$_4$R$_5$; and Z is selected from the group consisting of a bond, CR$_6$R$_7$, SiR$_8$R$_9$, NR$_{10}$, and PR$_{11}$, wherein each of R$_1$ to R$_{11}$ is selected from the group consisting of i) a C$_1$ to C$_{20}$ hydrocarbyl group and ii) a perfluorinated C$_1$ to C$_{20}$ hydrocarbyl group with the proviso that at least one of Y$_1$ and Y$_2$ contains at least one fluorine atom; and each L is independently fluorinated alkyl, fluorinated aryl, fluorinated alkoxy, fluorinated aryloxy, alkoxy or aryloxy ligand;

n=0, 2, m=2, 1;

2m+n=4; and $[Cat]^+$ is a non-interfering cation.

2. The process according to claim 1 wherein $[Cat]^+$ is selected from carbonium and anilinium.

3. The process according to claim 2 wherein $[Cat]^+$ is $[trityl]^+$.

4. The process according to claim 1 wherein each X is oxygen, Z is a bond and each of $Y_1$ and $Y_2$ is independently defined by the formula $CR_2R_3$ and each $R_2$ and $R_3$ is a perfluorinated hydrocarbyl having from 3 to 20 carbon atoms.

5. The process according to claim 4 wherein m is 2.

6. The process according to claim 5 wherein each $R_2$ and $R_3$ is a linear perfluorinated hydrocarbyl having from 3 to 5 carbon atoms, with the further proviso that $R_2$ and $R_3$ are not bridged.

7. The process according to claim 1 wherein said activator is $[Cat]^+[B\{OC(CF_3)_2C(CF_3)_2O\}_2]^-$.

8. The process according to claim 1 which is conducted under solution polymerization conditions in the presence of MAO.

* * * * *